(12) United States Patent
Yoda

(10) Patent No.: US 7,161,275 B2
(45) Date of Patent: Jan. 9, 2007

(54) ACTUATOR

(75) Inventor: Mitsuhiro Yoda, Suwa (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/449,792

(22) Filed: Jun. 8, 2006

(65) Prior Publication Data
US 2006/0226734 A1    Oct. 12, 2006

Related U.S. Application Data

(62) Division of application No. 10/976,247, filed on Oct. 27, 2004, now Pat. No. 7,095,156.

(30) Foreign Application Priority Data
Oct. 29, 2003    (JP) .............................. 2003-369545

(51) Int. Cl.
*G02B 26/00* (2006.01)
*H02N 1/00* (2006.01)

(52) U.S. Cl. ...................... 310/309; 359/224; 359/225; 359/291

(58) Field of Classification Search ................ 310/308, 310/309; 359/224–225
See application file for complete search history.

(56) References Cited

U.S. PATENT DOCUMENTS

| | | | |
|---|---|---|---|
| 4,421,381 A | 12/1983 | Ueda et al. .................. 359/214 |
| 5,268,784 A * | 12/1993 | Chaya ......................... 359/214 |
| 5,543,956 A | 8/1996 | Nakagawa et al. ......... 359/225 |
| 5,629,790 A | 5/1997 | Neukermans et al. ....... 359/198 |
| 5,648,618 A | 7/1997 | Neukermans et al. .... 73/862.08 |
| 6,175,443 B1 * | 1/2001 | Aksyuk et al. ............. 359/291 |
| 6,388,789 B1 | 5/2002 | Bernstein .................... 359/198 |
| 6,795,225 B1 * | 9/2004 | Tsuboi et al. ............... 359/224 |
| 6,831,765 B1 * | 12/2004 | Yasuda et al. .............. 359/224 |
| 6,882,455 B1 | 4/2005 | Arima ......................... 359/198 |
| 6,909,221 B1 | 6/2005 | Ayazi et al. ................. 310/321 |
| 6,924,915 B1 | 8/2005 | Hirose et al. ............... 359/224 |

FOREIGN PATENT DOCUMENTS

JP     06-269186    9/1994

(Continued)

OTHER PUBLICATIONS

Kurt E. Peterson, Silicon Torsional Scanning Mirror, IBJ J. Res. Develop., vol. 24, No. 5, Sep. 1980.

*Primary Examiner*—Burton Mullins
(74) *Attorney, Agent, or Firm*—Harness, Dickey & Pierce, P.L.C.

(57) ABSTRACT

An actuator 100 of the type employing a two-degree-of-freedom vibration system includes: a pair of first mass portions 1, 11; a second mass portion 2 provided between the pair of first mass portions 1, 11; a pair of supporting portions 3, 3 for supporting the pair of first mass portions 1, 11 and the second mass portion 2; at least a pair of first elastic connecting portions 4, 4 which respectively connect the first mass portions 1, 11 to the supporting portions 3, 3 so that each of the first mass portions 1, 11 can rotate with respect to the supporting portions 3, 3; and at least a pair of second elastic connecting portions 5, 5 which respectively connect the second mass portion 2 to the first mass portions 1, 11 so that the second mass portion 2 can rotate with respect to the first mass portion 1, 11. Each of the first mass portions 1, 11 is driven by the application of an alternating voltage, causing the second mass portion 2 to rotate.

5 Claims, 10 Drawing Sheets

FOREIGN PATENT DOCUMENTS

| JP | 07-092409 | 4/1995 |
| JP | 08-023685 | 1/1996 |
| JP | 10/323059 | 12/1998 |
| JP | 3003429 | 11/1999 |

* cited by examiner

ACTUATOR

CROSS REFERENCE TO RELATED APPLICATIONS

This application is a divisional patent application of U.S. Ser. No. 10/976,247 filed Oct. 27, 2004, claiming priority to JP 2003-369545 filed Oct. 29, 2003, all of which are hereby incorporated by reference.

BACKGROUND OF THE INVENTION

1. Field of the Invention

The present invention relates to an actuator, and in particular relates to an actuator of the type employing a two-degree-of-freedom vibration system.

2. Description of the Prior Art

There is known a polygon mirror (rotary polyhedron) as an actuator provided in laser printers, for example. In such a printer, in order to achieve higher-resolution and higher-quality printed output as well as higher-speed printing, it is necessary to rotate the polygon mirror at higher speed. Currently, an air bearing is used to rotate the polygon mirror at high speed with stability. However, there is a problem in that it is difficult to rotate the polygon mirror at much higher speed than the speed available at the present. Further, although a larger motor is required in order to rotate the polygon mirror at higher speed, use of such a larger motor arises a problem in that it is difficult to miniaturize the size of an apparatus in which the polygon mirror is used. Furthermore, use of such a polygon mirror arises another problem in that the structure of the apparatus becomes necessarily complicated, thus leading to increased manufacturing cost.

On the other hand, a single-degree-of-freedom torsional vibrator as shown in FIG. 10 has been proposed since the early stages of research in the field of actuators. Since this vibrator uses flat electrodes which are arranged in parallel with each other, it can have quite simple structure (see K. E. Petersen: "Silicon Torsional Scanning Mirror", IBMJ. Res. Develop., Vol. 24 (1980), P. 631, for example). Further, a single-degree-of-freedom electrostatic drive type vibrator obtained by modifying the torsional vibrator described above so as to have a cantilever structure has also been proposed (see Kawamura et al.: "Research in micromechanics using Si", Proceedings of the Japan Society for Precision Engineering Autumn Conference (1986), P. 753, for example).

FIG. 10 shows such a single-degree-of-freedom electrostatic drive type torsional vibrator. In the torsional vibrator in FIG. 10, a movable electrode plate 300 made of monocrystalline silicon is fixed at end fixing portions 300a thereof to the both ends of a glass substrate 1000 through spacers 200. The movable electrode plate 300 includes a movable electrode portion 300c which is supported by the end fixing portions 300a through narrow torsion bars 300b. Further, a fixed electrode 400 is provided on the glass substrate 1000 so as to be opposed to the movable electrode portion 300c through a predetermined electrode interval. Specifically, the fixed electrode 400 is arranged in parallel with the movable electrode portion 300c through the electrode interval therebetween. The fixed electrode 400 is connected to the movable electrode plate 300 via a switch 600 and a power source 500.

In the torsional vibrator having the structure described above, when a voltage is applied across the movable electrode portion 300c and the fixed electrode 400, the movable electrode portion 300c rotates around the axis of the torsion bars 300b due to electrostatic attraction. Since electrostatic attraction is inversely proportional to the square of an electrode interval, it is preferable for this type of electrostatic actuator to have a small electrode interval between the movable electrode portion 300c and the fixed electrode 400. However, in such a single-degree-of-freedom torsional vibrator described above, the movable electrode portion 300c which serves as a movable portion is also provided with the electrode. Therefore, if the electrode interval becomes too small, a movable range (rotation angle) of the movable electrode portion 300c is necessarily limited. On the other hand, in order to enlarge the movable range of the movable electrode portion 300c, it is necessary to widen the electrode interval and this in turn needs a large driving voltage. Namely, such a single-degree-of-freedom torsional vibrator described above involves a problem in that it is difficult to achieve both of low-voltage driving and large displacement.

SUMMARY OF THE INVENTION

It is therefore an object of the present invention to provide an actuator capable of operating at low voltage and achieving a large displacement (that is, large rotation angle or large deflection angle).

In order to achieve the object, the present invention is directed to an actuator of the type employing a two-degree-of-freedom vibration system. The actuator of the present invention includes:

a pair of first mass portions;

a second mass portion provided between the pair of first mass portions;

a pair of supporting portions for supporting the pair of first mass portions and the second mass portion;

at least a pair of first elastic connecting portions which respectively connect the first mass portions to the supporting portions so that each of the first mass portions can rotate with respect to the supporting portions; and at least a pair of second elastic connecting portions which respectively connect the second mass portion to the first mass portions so that the second mass portion can rotate with respect to the first mass portions;

wherein each of the first mass portions is driven by the application of an alternating voltage, causing the second mass portion to rotate.

According to the present invention described above, it is possible to provide an actuator capable of operating at low voltage and achieving a large rotation angle (that is, large deflection angle).

In the actuator according to the present invention, it is preferred that, in the case where a length between a central axis for the rotation of one of the first mass portions and an end portion of the one of the first mass portions in a direction substantially perpendicular to the central axis for the rotation is defined as L1, a length between a central axis for the rotation of the other of the first mass portions and an end portion of the other of the first mass portions in a direction substantially perpendicular to the central axis for the rotation is defined as L2, and a length between a central axis for the rotation of the second mass portion and an end portion of the second mass portion in a direction substantially perpendicular to the central axis for the rotation is defined as L3, then L1, L2 and L3 satisfy the relations: L1<L3 and L2<L3.

This makes it possible to provide an actuator capable of operating at low voltage and achieving a large rotation angle (that is, large deflection angle) more easily and reliably.

In the actuator according to the present invention, it is preferred that the length L1 is substantially the same as the length L2.

This makes it possible to control the actuator easily, and therefore it is possible to provide an actuator capable of operating at low voltage and achieving a large rotation angle (that is, large deflection angle) more easily and reliably.

In the actuator according to the present invention, it is preferred that the frequency of the alternating voltage is set so as to be substantially the same as a lower resonance frequency of resonance frequencies of the two-degree-of-freedom vibration system at which the pair of first mass portions and the second mass portion resonate.

This makes it possible to provide an actuator capable of operating at low voltage and achieving a large rotation angle (that is, large deflection angle). Further, it is also possible to increase a rotation angle (deflection angle) of the second mass portion while vibration (amplitude) of the first mass portion is suppressed.

In the actuator according to the present invention, it is preferred that the actuator includes:

a counter substrate provided so as to be opposed to the pair of supporting portions through a predetermined distance, the counter substrate having a surface facing the supporting portions;

at least a pair of electrodes provided on the surface of the counter substrate at a position corresponding to the position of the one of the first mass portions; and at least a pair of electrodes provided on the surface of the counter substrate at a position corresponding to the position of the other of the first mass portions;

wherein each of the first mass portions is driven by electrostatic force generated between each of the first mass portions and the corresponding electrodes.

This makes it possible to further increase a rotation angle (deflection angle) of the second mass portion.

In the actuator according to the present invention, it is also preferred that the counter substrate includes an opening at a position corresponding to the position of the second mass portion.

Such an actuator makes it possible to prevent a contact between the second mass portion and the counter substrate when the second mass portion rotates, and as a result, it is possible to further increase a rotation angle (deflection angle) of the second mass portion.

In the actuator according to the present invention, it is also preferred that the second mass portion includes a light reflection portion.

Such an actuator makes it possible to change optical (light) path easily when it is used in an optical scanner, for example.

In the actuator according to the present invention, it is also preferred that, in the case where the spring constant of the first elastic connecting portion is defied as $k_1$ and the spring constant of the second elastic connecting portion is defined as $k_2$, $k_1$ and $k_2$ satisfy the relation: $k_1 > k_2$.

This makes it possible to further increase the rotation angle (deflection angle) of the second mass portion while vibration (amplitude) of the first mass portion is suppressed.

In the actuator according to the present invention, it is also preferred that, in the case where the moment of inertia of the pair of first mass portions is defined as $J_1$ and the moment of inertia of the second mass portion is defined as $J_2$, $J_1$ and $J_2$ satisfy the relation: $J_1 \leq J_2$.

This makes it possible to further increase the rotation angle (deflection angle) of the second mass portion while the vibration (amplitude) of the first mass portion is suppressed.

In the actuator according to the present invention, it is also preferred that at least one of the pair of first elastic connecting portions and the pair of second elastic connecting portions includes a piezoresistive element.

This makes it possible to detect rotation angles and rotation frequencies, for example. Further, it is also possible to utilize the detection results to control the attitude of the second mass portion.

The above and other objects, features and advantages of the present invention will readily become more apparent when the following detailed description of the preferred embodiments of the present invention will be considered taken in conjunction with the accompanying drawings.

DETAILED DESCRIPTION OF THE INVENTION

Hereinafter, preferred embodiments of an actuator according to the present invention will be described with reference to the appended drawings.

First Embodiment

Figure 1:
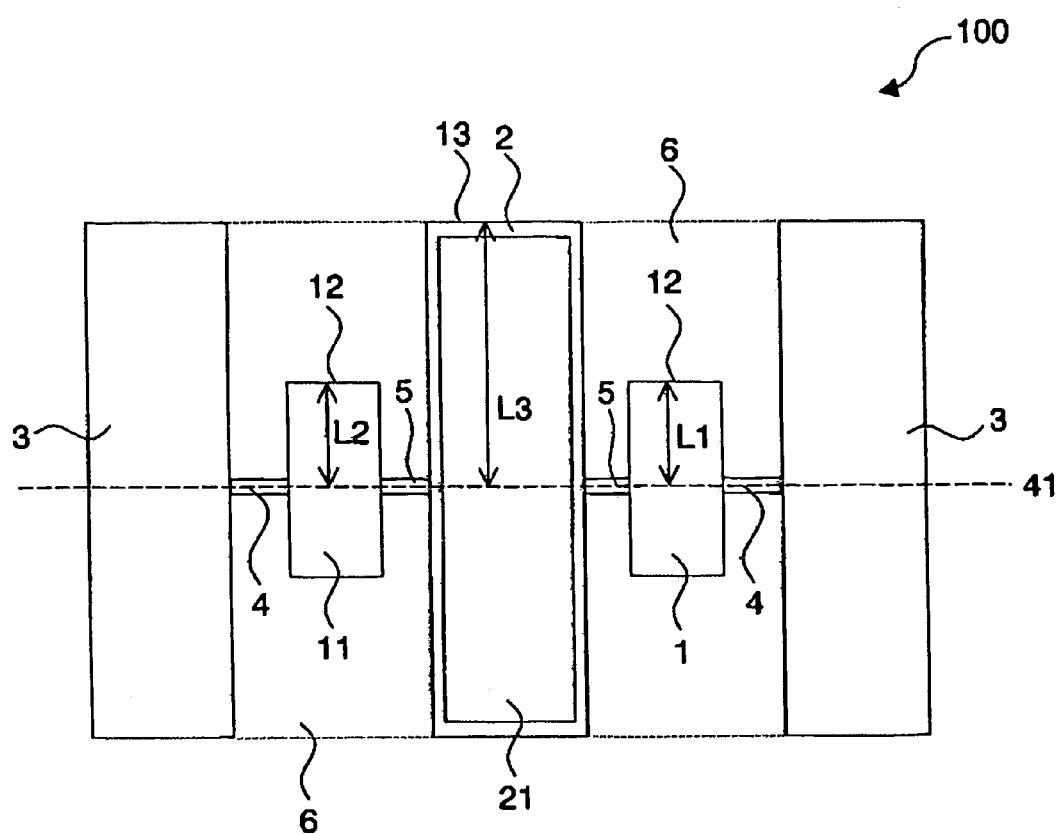
FIG. 1 is a plan view which shows a first embodiment of the actuator according to the present invention.
Figure 2:
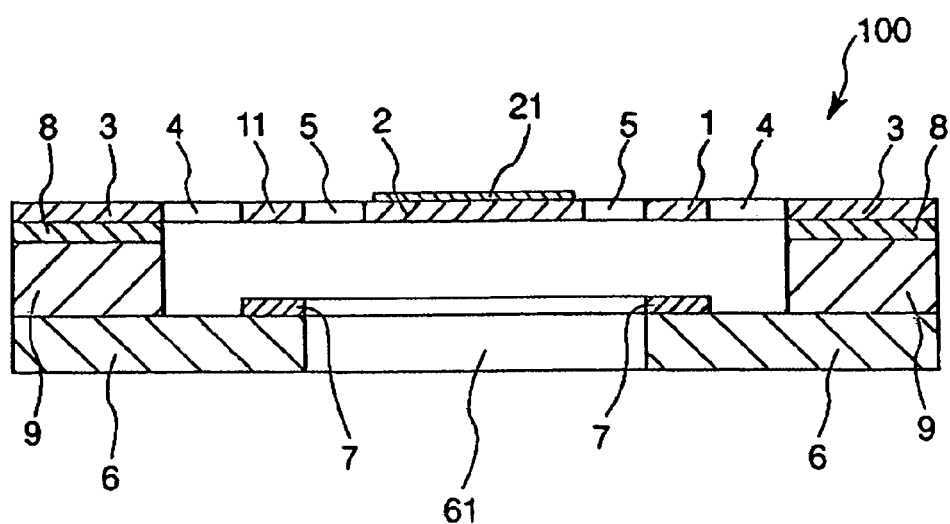
FIG. 2 is a cross-sectional view which shows the first embodiment of the actuator according to the present invention.
Figure 3:
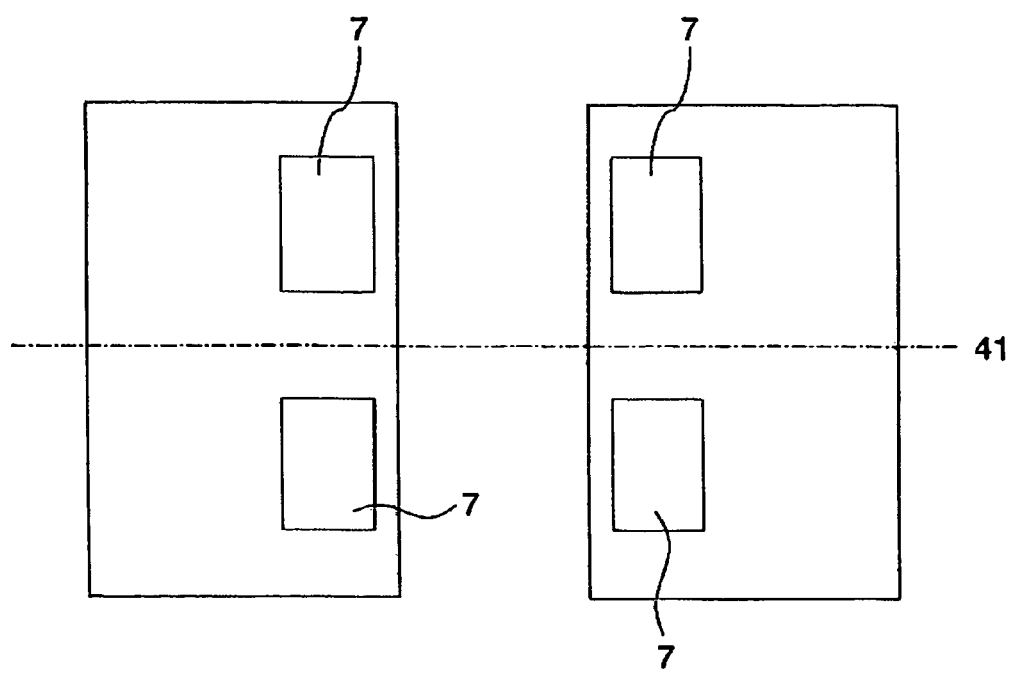
FIG. 3 is a plan view which shows a counter substrate and electrodes of the first embodiment.
Figure 4:
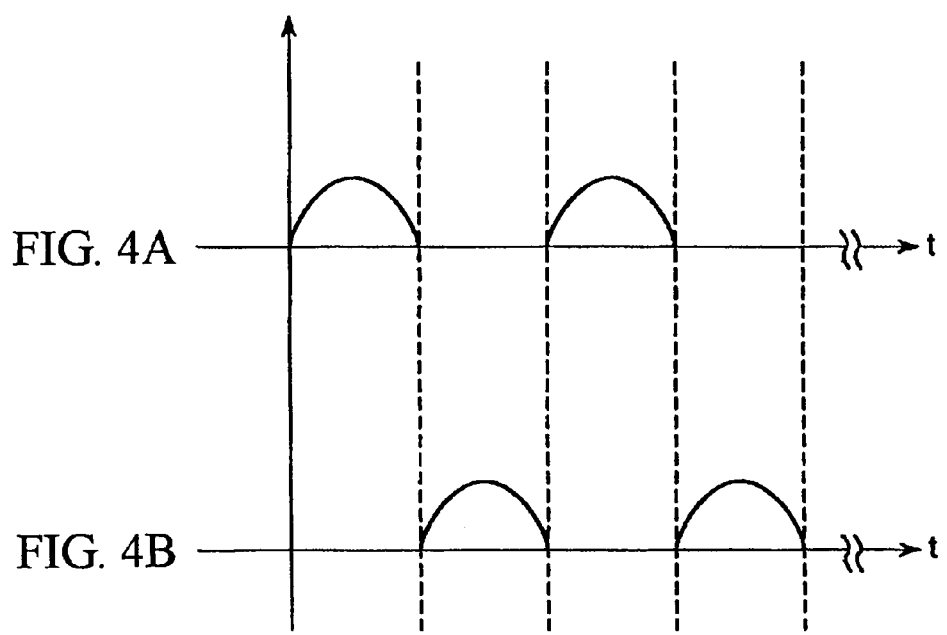
FIG. 4 is a drawing which shows an example of the alternating voltage to be applied to the actuator shown in FIG.
Figure 5:
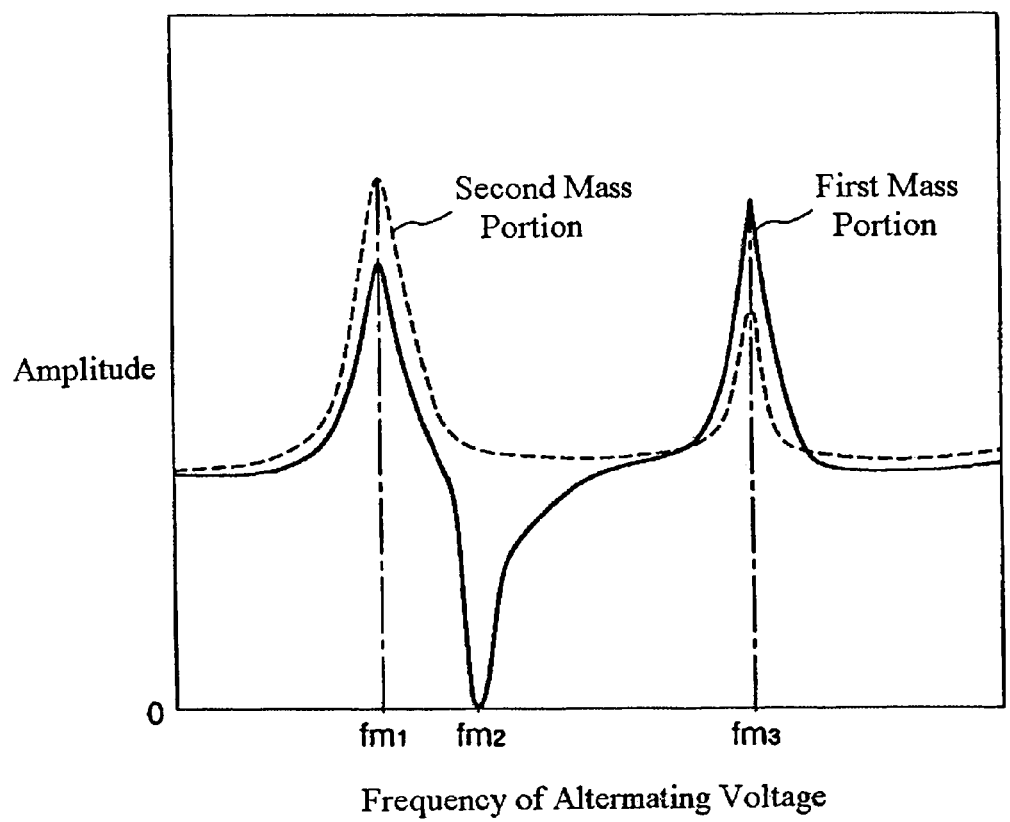
FIG. 5 is a graph which shows the frequency of an alternating voltage applied and the resonance curves of a first mass portion and a second mass portion.

First, a first embodiment of the actuator according to the present invention will be described. FIG. 1 is a plan view which shows the first embodiment of the actuator according to the present invention. FIG. 2 is a cross-sectional view which shows the first embodiment of the actuator according to the present invention. FIG. 3 is a plan view which shows a counter substrate and electrodes of the first embodiment. FIG. 4 is a drawing which shows an example of the alternating voltage to be applied to the actuator shown in FIG. 1. FIG. 5 is a graph which shows the frequency of an alternating voltage applied and the resonance curves of a first mass portion and a second mass portion. In the following description, it is to be noted that the upper side, the lower side, the right side and the left side in FIGS. 1 and 3 will be referred to as the "upper side", "lower side", "right side" and the "left side", respectively.

An actuator 100 shown in FIG. 1 includes a first mass portion (that is, a driving portion) 1, a second mass portion (that is, a movable portion) 2, and a pair of supporting portions 3. In the actuator 100, the second mass portion 2 is positioned at the center thereof, and the first mass portions 1, 11 are provided at one end side (right side in FIG. 1) and the other side (left side in FIG. 1) of the second mass portion 2, respectively. Further, one supporting portion 3 is arranged at the right side of the first mass portion 1 in FIG. 1, while the other supporting portion 3 is arranged at the left side of the first mass portion 11 in FIG. 1.

In the present embodiment, as shown in FIG. 1, the first mass portions 1, 11 has substantially the same shape and size, and are symmetrically provided with respect to the second mass portion 2. Each of the first mass portions 1 and 11, the second mass portion 2, and the supporting portions 3, 3 is made of silicon or the like, for example. On the surface of the second mass portion 2 of this embodiment (that is, the surface of the second mass portion 2 which does not face a counter substrate 6 which will be described later), there is provided a light reflection portion 21.

Further, as shown in FIG. 1, the actuator 100 includes a pair of first elastic connecting portions 4, 4 and a pair of second elastic connecting portions 5, 5. The pair of first elastic connecting portions 4, 4 connect the first mass portions 1, 11 to the supporting portions 3, 3, respectively, so that each of the first mass portions 1, 11 can rotate with respect to the corresponding supporting portion 3. The pair of second elastic connecting portions 5, 5 connect the second mass portion 2 to the first mass portions 1, 11, respectively, so that the second mass portion 2 can rotate with respect to the first mass portions 1, 11. In other words, the second mass portion 2 is connected to the first mass portions 1, 11 via the second elastic connecting portions 5, 5, respectively, and the first mass portions 1, 11 are connected to the supporting portions 3, 3 via the first elastic connecting portions 4, 4, respectively. In this case, the first elastic connecting portions 4, 4 and the second elastic connecting portions 5, 5 are coaxially provided to constitute a central axis for the rotation of the first and second mass portions 1, 11, 2 (that is, rotational axis) 41.

As shown in FIG. 2, the supporting portions 3, 3 are joined to spacers 9 through insulating portions 8, 8, respectively. Each of the insulating portions 8 is made of oxides or nitrides of silicon, for example, and each of the spacers 9 is made of silicon, for example. Further, as shown in FIG. 2, the actuator 100 of this embodiment includes the counter substrate 6. The counter substrate 6 is provided so as to be opposed to the supporting portions 3, 3 through a predetermined distance. The counter substrate 6 is made of various glass materials or silicon, for example.

As shown in FIG. 2, the supporting portions 3, 3 are respectively supported on the counter substrate 6 through the spacers 9, 9 and the insulating portions 8, 8. As shown in FIGS. 2 and 3, the counter substrate 6 has an opening 61 at a position corresponding to the position of the second mass portion 2. Further, on the counter substrate 6, there are provided two pairs of electrodes 7 at a position corresponding to the position of the first mass portions 1, 11, respectively. The two pairs of electrodes 7 are provided so as to become substantially symmetrical to each other in each pair of electrodes 7 with respect to the surface including the central axis for rotation 41 (that is, the rotational axis of the first mass portions 1, 11) and perpendicular to the counter substrate 6.

The two pair of electrodes 7 are connected to the first mass portions 1, 11 via a power source (not shown in the drawings) so that an alternating voltage (driving voltage) can be applied across the first mass portions 1, 11 and the two pair of electrodes 7, respectively. In this regard, insulating films (not shown in the drawings) are respectively provided on the surfaces of the first mass portions 1, 11 (that is, the surfaces of the first mass portions 1, 11 facing the electrodes 7) to prevent a short circuit. In such a two-degree-of-freedom vibration type actuator having the structure as described above, the first mass portions 1, 11 and the first elastic connecting portions 4, 4 constitute a first vibration system, and the second mass portion 2 and the second elastic connecting portions 5, 5 constitute a second vibration system.

A sinusoidal wave (alternating voltage) or the like is applied across each of the first mass portions 1, 11 and the corresponding electrodes 7, for example. Specifically, for example, when the first mass portions 1, 11 are connected to ground, and voltage signals each having a waveform as shown in FIGS. 4A and 4B are respectively applied to the two electrodes 7, 7 at the upper side in FIG. 3 and the two electrodes 7, 7 at the lower side in FIG. 3, electrostatic force is generated between the first mass portions 1, 11 and the corresponding electrodes 7. The force attracting the first mass portions 1, 11 toward the electrodes 7 due to the generated electrostatic force changes depending on the phase of each of the waveforms so that the first mass portions 1, 11 rotate around the central axis for rotation 41 (the axis of the first elastic connecting portions 4, 4) (that is, the first mass portions 1, 11 vibrate by the application of the alternating voltage). The vibration of each of the first mass portions 1, 11 causes the second mass portion 2, which is connected to both of the first mass portions 1, 11 through the second elastic connecting portions 5, 5, to rotate around the central axis for rotation 41 (the axis of the second elastic connecting portions 5, 5) (that is, the second mass portion 2 also vibrates or is deflected).

Here, a length (distance) between the central axis for rotation 41 on the first mass portion 1 and an end portion of the first mass portion 1 in a direction substantially perpendicular to the central axis for rotation 41 is defined as L1, a length (distance) between the central axis for rotation 41 on the first mass portion 11 and an end portion of the first mass portion 11 in a direction substantially perpendicular to the central axis for rotation 41 is defined as L2, and a length (distance) between the central axis for rotation on the second mass portion 2 and an end portion of the second mass portion 2 in a direction substantially perpendicular to the central axis for rotation 41 is defined as L3. Since the first mass portions 1, 11 are provided independently of each other, the first mass portions 1, 11 do not interfere in the second mass portion 2. Thus, it is possible to make the lengths L1 and L2 smaller regardless of the size of the second mass portion 2. This makes it possible to enlarge the rotation angle of each of the first mass portions 1, 11 (that is, deflection angle of the second mass portion 2 with respect to the direction parallel to the surface on which the electrodes 7 of the counter substrate 6 are provided), and therefore it is possible to enlarge the rotation angle of the second mass portion 2.

Further, by making the lengths L1 and L2 smaller, it is possible to make the distance between the respective first mass portions 1, 11 and each of the corresponding electrodes 7 smaller. This makes it possible to enlarge the electrostatic force, and therefore it is possible to diminish the alternating voltage applied between each of the first mass portions 1, 11 and each of the electrodes 7. In this regard, it is preferable that the lengths L1, L2 and L3 (that is, sizes of the first mass portions 1, 11 and the second mass portion 2) are set so as to satisfy the relations: L1<L3 and L2<L3.

By satisfying the relations described above, it is possible to make the lengths L1, L2 further smaller. This makes it possible to enlarge the rotation angles of the first mass portions 1, 11, and therefore it is possible to further enlarge the deflection angle of the second mass portion 2. In this case, it is preferable that the maximum deflection angle of the second mass portion 2 is set so as to become 20° or more.

Moreover, by making the lengths L1, L2 smaller, it is possible to further reduce the distance between each of the first mass portions 1, 11 and each of the corresponding electrodes 7, and therefore it is possible to further diminish the alternating voltage applied between each of the first mass portions 1, 11 and each of the corresponding electrodes 7. Therefore, it is possible to realize (achieve) the low-voltage driving for the first mass portions 1, 11 and the large displacement of the second mass portion 2. For example, in the case where the actuator described above is applied to an optical scanner used in apparatuses such as laser printer, confocal scanning laser microscope, it is possible to make the apparatus smaller more easily.

In this regard, as mentioned above, although the lengths L1 and L2 are set so as to have substantially the same size in this embodiment, it is no wonder that the length L1 may be different from the length L2. It should be noted that such a two-degree-of-freedom vibration type actuator has a frequency characteristic as shown in FIG. 5 between the amplitudes (vibrations) of the first mass portions 1, 11 and the second mass portion 2 and the frequency of the applied alternating voltage.

Namely, the two-degree-of-freedom vibration system constituted from the first mass portions 1, 11, the first elastic connecting portions 4, 4, the second mass portion 2 and the second elastic connecting portions 5, 5 has two resonance frequencies $fm_1$ (kHz) and $fm_3$ (kHz) (where, $fm_1 < fm_3$) at which the amplitudes of the first mass portions 1, 11 and the second mass portion 2 become large, and one antiresonance frequency $fm_2$ (kHz) at which the amplitude of the first mass portions 1, 11 becomes substantially zero.

In this actuator 100, it is preferable that the frequency F of an alternating voltage to be applied across each of the first mass portions 1, 11 and the electrodes 7 is set so as to be substantially the same as a lower resonance frequency of the two resonance frequencies, that is, the frequency F is set so as to be substantially the same as $fm_1$. By setting the frequency F (kHz) of an alternating voltage to be applied so as to be substantially the same as $fm_1$ (kHz), it is possible to increase the rotation angle (deflection angle) of the second mass portion 2 while the vibration of the first mass portions 1, 11 is suppressed. In this regard, it is to be noted that, in this specification, the fact that F (kHz) is substantially the same as $fm_1$ (kHz) means that F and $fm_1$ satisfy the relation: $(fm_1-1) \leq F \leq (fm_1+1)$.

The average thickness of each of the first mass portion 1, 11 is preferably in the range of 1 to 1,500 μm, more preferably it is in the range of 10 to 300 μm. Similarly, the average thickness of the second mass portion 2 is preferably in the range of 1 to 1,500 μm, more preferably it is in the range of 10 to 300 μm.

The spring constant of each of the first elastic connecting portions 4, 4 ($k_1$) is preferably in the range of $1 \times 10^{-4}$ to $1 \times 10^4$ Nm/rad, more preferably it is in the range of $1 \times 1^{-2}$ to $1 \times 10^3$ Nm/rad, further more preferably it is in the range of $1 \times 10^{-1}$ to $1 \times 10^2$ Nm/rad. By setting the spring constant of each of the first elastic connecting portions 4, 4 ($k_1$) to a value within the above range, it is possible to further increase the rotation angle (deflection angle) of the second mass portion 2.

Similarly, the spring constant of each of the second elastic connecting portions 5, 5 ($k_2$) is preferably in the range of $1 \times 10^{-4}$ to $1 \times 10^4$ Nm/rad, more preferably it is in the range of $1 \times 10^{-2}$ to $1 \times 10^3$ Nm/rad, further more preferably it is in the range of $1 \times 10^{-1}$ to $1 \times 10^2$ Nm/rad. By setting the spring constant of each of the second elastic connecting portions 5, 5 ($k_2$) to a value within the above range, it is possible to further increase the rotation angle (deflection angle) of the second mass portion 2 while the vibration of each of the first mass portions 1, 11 is suppressed.

In the case where the spring constant of each of the first elastic connecting portions 4, 4 is defined as $k_1$, and the spring constant of each of the second elastic connecting portions 5, 5 is defined as $k_2$, it is preferred that $k_1$ and $k_2$ satisfy the relation: $k_1 > k_2$. This makes it possible to further increase the rotation angle (deflection angle) of the second mass portion 2 while the vibration of each of the first mass portions 1, 11 is suppressed.

Further, in the case where the moment of inertia of each of first mass portions 1, 11 is defined as $J_1$ and the moment of inertia of the second mass portion 2 is defined as $J_2$, it is preferred that $J_1$ and $J_2$ satisfy the relation: $J_1 \leq J_2$, and more preferably they satisfy the relation: $J_1 < J_2$. This makes it possible to further increase the rotation angle (deflection angle) of the second mass portion 2 while the vibration of each of the first mass portions 1, 11 is suppressed.

Now, the natural frequency of the first vibration system $\omega_1$ can be determined by the formula: $\omega_1 = (k_1/J_1)^{1/2}$ in the case where $J_1$ represents the moment of inertia of each of the first mass portions 1, 11 and $k_1$ represents the spring constant of each of the first elastic connecting portions 4, 4. The natural frequency of the second vibration system $\omega_2$ can be determined by the formula: $\omega_2 = (k_2/J_2)^{1/2}$ in the case where $J_2$ represents the moment of inertia of the second mass portion 2, and $k_2$ represents the spring constant of each of the second elastic connecting portions 5, 5.

It is preferable that the natural frequency of the first vibration system $\omega_1$ and the natural frequency of the second vibration system $\omega_2$ determined in such a manner described above satisfy the relation: $\omega_1 > \omega_2$. This makes it possible to further increase the rotation angle (deflection angle) of the second mass portion 2 while the vibration of each of the first mass portions 1, 11 is suppressed.

In this regard, in the actuator 100 of this embodiment, it is preferred that the actuator 100 has a piezoresistive element in at least one of the pair of first elastic connecting portions 4, 4 and the pair of second elastic connecting portions 5, 5 thereof. This makes it possible to detect rotation angles and rotation frequencies, for example. Further, it is also possible to utilize the detection results to control the attitude of the second mass portion 2.

Figure 6:
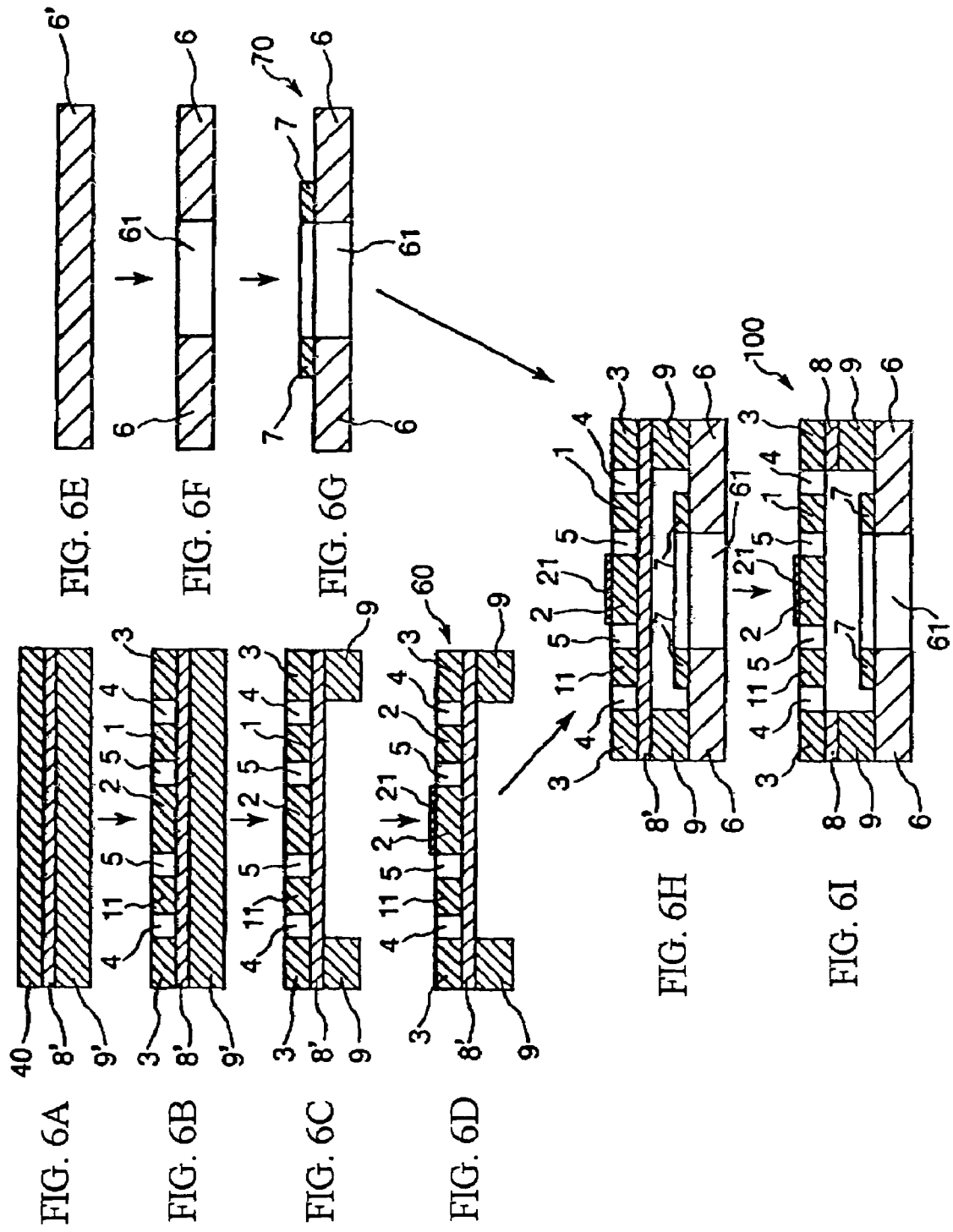
FIG. 6 is a step diagram which shows one example of a method for manufacturing the actuator according to the present invention.

Next, one example of a method of manufacturing the actuator 100 as shown in FIGS. 1 and 2 will be described with reference to the accompanying drawings. FIG. 6 is a step diagram which shows one example of a method of manufacturing the actuator 100. In this example, the actuator 100 is manufactured through the following three steps.

<First step>

First, as shown in FIG. 6A, an SOI substrate 50 constituted from a first Si layer 40, an $SiO_2$ layer 8', and a second Si layer 9' is prepared. Next, as shown in FIG. 6B, the first Si layer 40 is subjected to etching to form the first mass portions 1, 11, the second mass portion 2, the supporting portions 3, 3, the first elastic connecting portions 4, 4 and the second elastic connecting portions 5, 5. Next, as shown in FIG. 6C, the second Si layer 9' is subjected to etching to form the spacers 9, 9. Then, as shown in FIG. 6D, the light reflection portion 21 is formed on the second mass portion 2 by a vacuum evaporation method or the like to obtain an upper substrate 60.

<Second step>

First, as shown in FIG. 6E, a glass substrate 6' is prepared. Next, as shown in FIG. 6F, the glass substrate 6' is subjected to etching to form the counter substrate 6 having the opening 61. Then, as shown in FIG. 6G, the electrodes 7 are formed on the counter substrate 6 by a vacuum evaporation method or the like to obtain a lower substrate 70.

<Third step>

As shown in FIG. 6H, the upper substrate 60 obtained in the first step and the lower substrate 70 obtained in the second step are bonded by anode bonding, for example. Next, as shown in FIG. 6I, a part of the $SiO_2$ layer 8', which is a part other than a part sandwiched between the supporting portions 3, 3 and the spacers 9, 9, is removed by etching to form the insulating portions 8, 8. In this way, the actuator 100 is manufactured. In this regard, it is to be noted that the second step may be carried out concurrently with the first step, or may be carried out prior to the first step.

Second Embodiment

Figure 7:
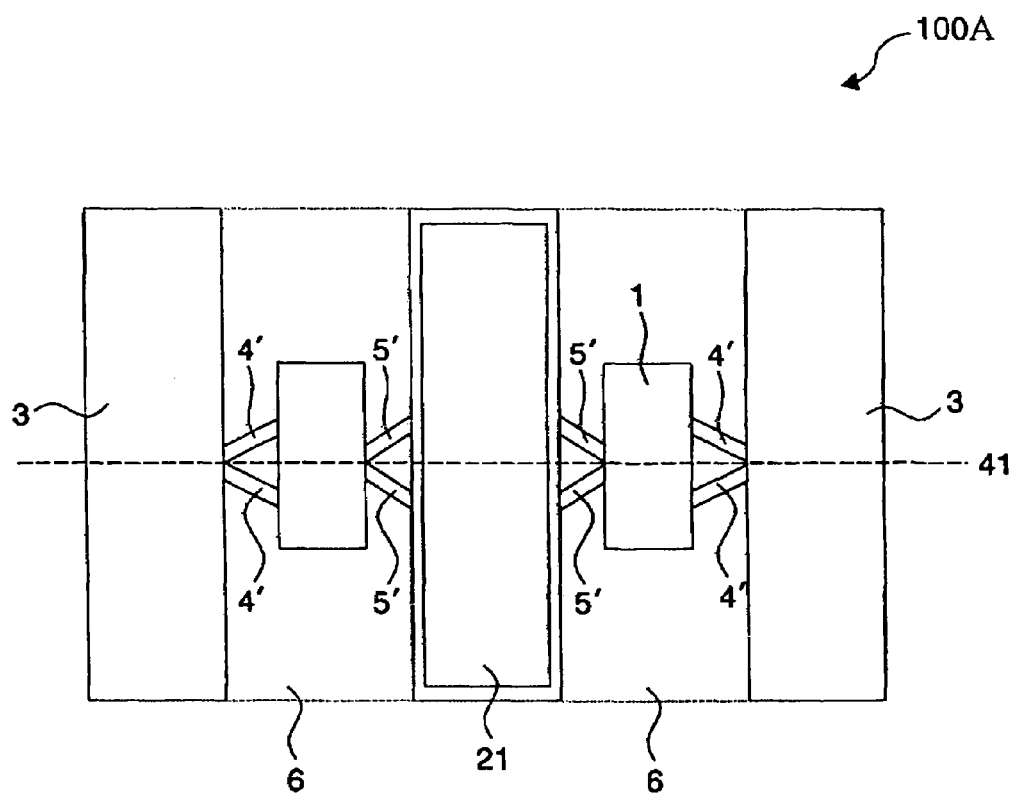
FIG. 7 is a plan view which shows a second embodiment of the actuator according to the present invention.

Next, a second embodiment of the actuator according to the present invention will be described. FIG. 7 is a plan view which shows the second embodiment of the actuator according to the present invention. Hereinafter, an actuator 100A shown in FIG. 7 will be described by focusing on the difference between the first and second embodiments, and therefore a description of the same points will be omitted.

As shown in FIG. 7, the actuator 100A of this embodiment includes two pairs of first elastic connecting portions 4' and two pairs of second elastic connecting portions 51. The two pairs of first elastic connecting portions 4' connect the first mass portions 1, 11 to the supporting portions 3, 3, respectively, so that each of the first mass portions 1, 11 can rotate with respect to the corresponding supporting portion 3. The two pairs of second elastic connecting portions 5' connect the second mass portion 2 to the first mass portions 1, 11, respectively, so that the second mass portion 2 can rotate with respect to the first mass portions 1, 11.

With such a structure, it is possible to control the rotation angle (deflection angle) of the second mass portion 2 more reliably. It should be noted that, in such a case, that is, in the case where the actuator 100A includes the two pairs of first elastic connecting portions 4' and the two pairs of second elastic connecting portions 5' as this embodiment, the spring constants $k_1$ and $k_2$ thereof is determined on the assumption that the two elastic connecting portions 4' connected between one of the supporting portions 3 and one of the first mass portions 1, 11 are equivalent to the single elastic connecting portion 4 of the first embodiment which is disposed at substantially the same position as the two elastic connecting portions 4' of this second embodiment.

Third Embodiment

Figure 8:
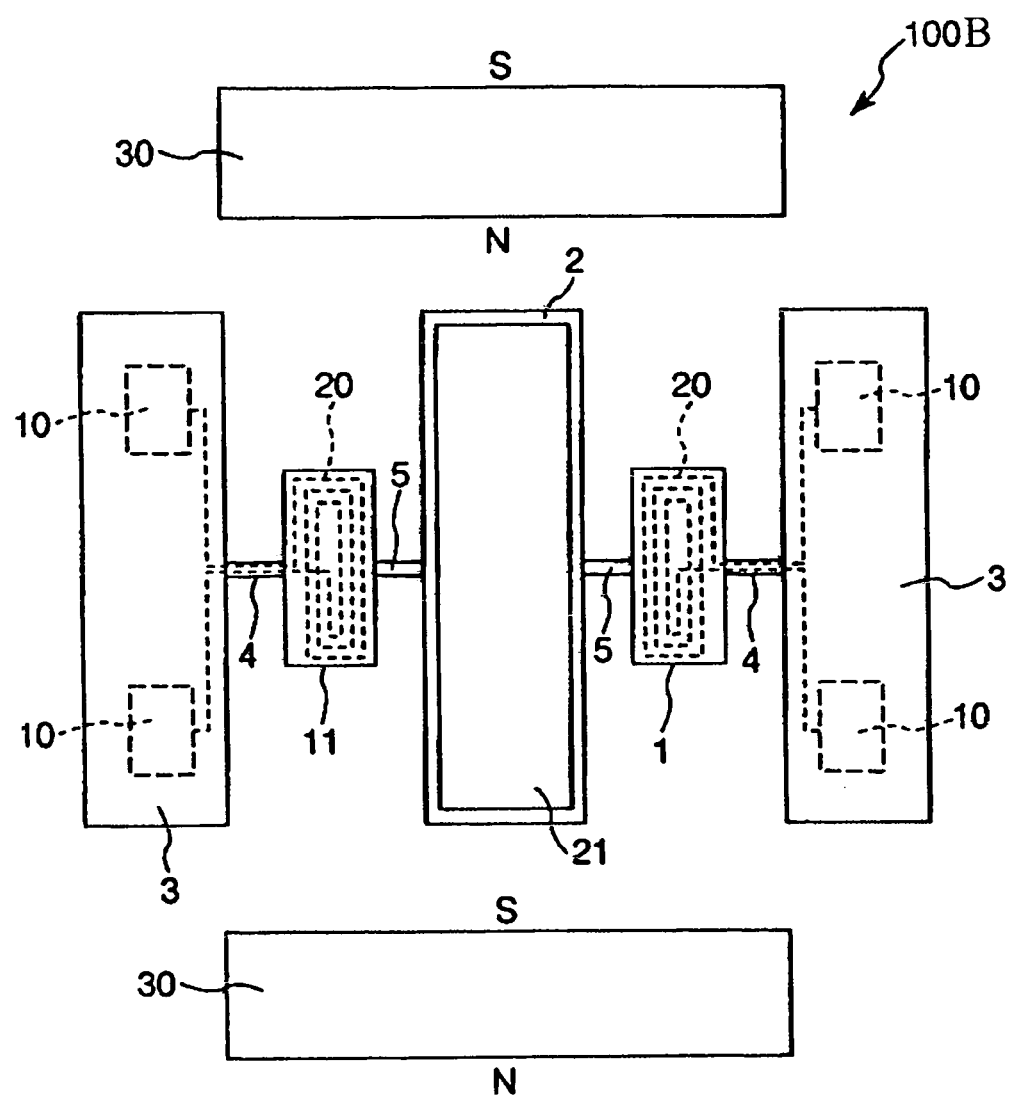
FIG. 8 is a plan view which shows a third embodiment of the actuator according to the present invention.

Next, a third embodiment of the actuator according to the present invention will be described. FIG. 8 is a plan view which shows the third embodiment of the actuator according to the present invention. Hereinafter, an actuator 100B shown in FIG. 8 will be described by focusing on the difference between the first and third embodiments, and therefore a description of the same points will be omitted. The actuator 100B of this embodiment is driven by electromagnetic force (that is, by Lorentz force)

Specifically, as shown in FIG. 8, the actuator 100B includes four terminals 10 provided in the supporting portions 3, 3 through insulating films (not shown in FIG. 8), two coils 20 respectively provided on the surfaces of the first mass portions 1, 11 (that is, the surfaces of the first mass portions 1, 11 which do not face the counter substrate 6), a pair of permanent magnets 30, 30 provided on both sides of the first mass portions 1, 11 so that the first mass portions 1, 11 are placed therebetween.

The pair of permanent magnets 30, 30 are arranged so that the south pole of one magnet 30 and the north pole of the other magnet 30 are opposed to each other. The end portions of each of the two coils 20, 20 are connected to the corresponding two terminals 10, 10, respectively. Further, each of the terminals 10 is connected to a power source (not shown in the drawings) so that an alternating voltage can be applied to each of the coils 20, 20. In this embodiment, when an alternating voltage is applied to each of the coils 20, 20, Lorentz force is generated between each of the coils 20 (first mass portions 1, 11) and the permanent magnets 30, and the generated Lorentz force drives the actuator 100B.

Fourth Embodiment

Figure 9:
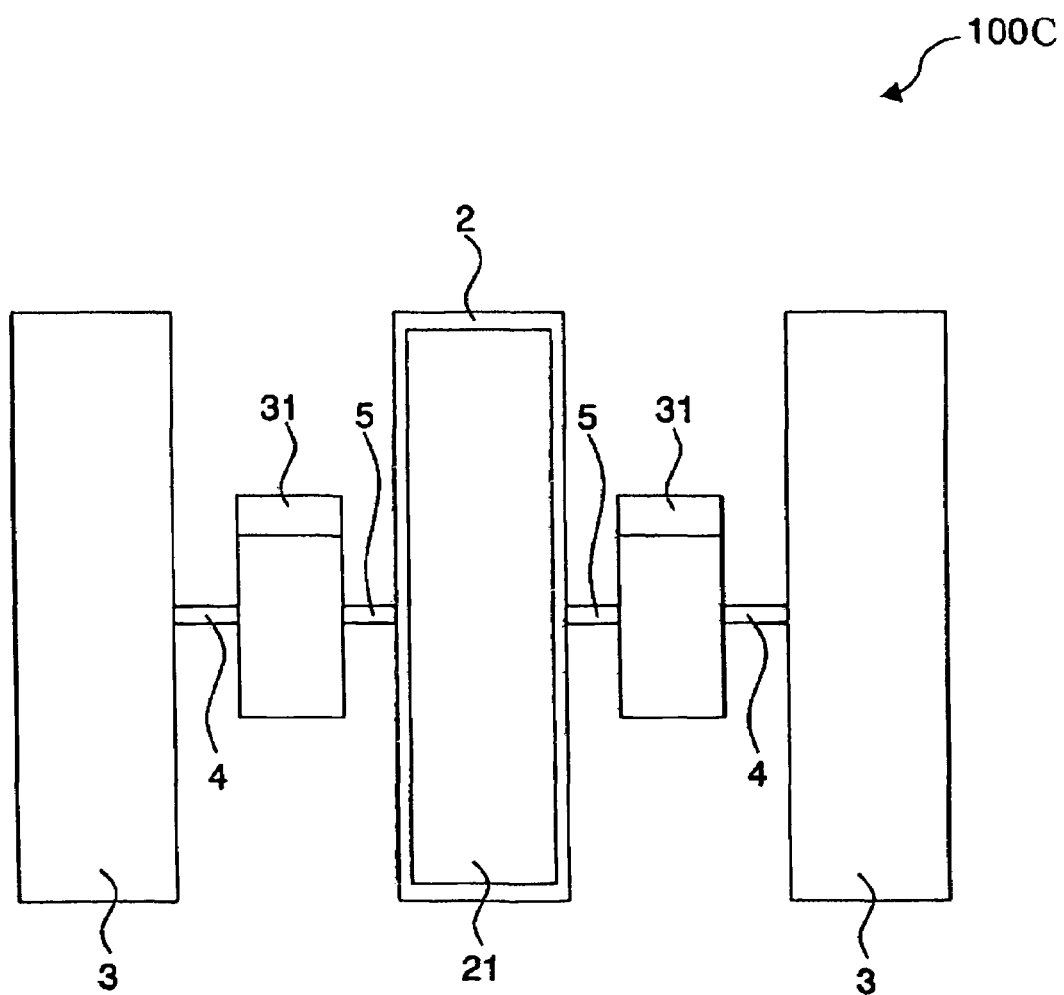
FIG. 9 is a plan view which shows a fourth embodiment of the actuator according to the present invention.
Figure 10:
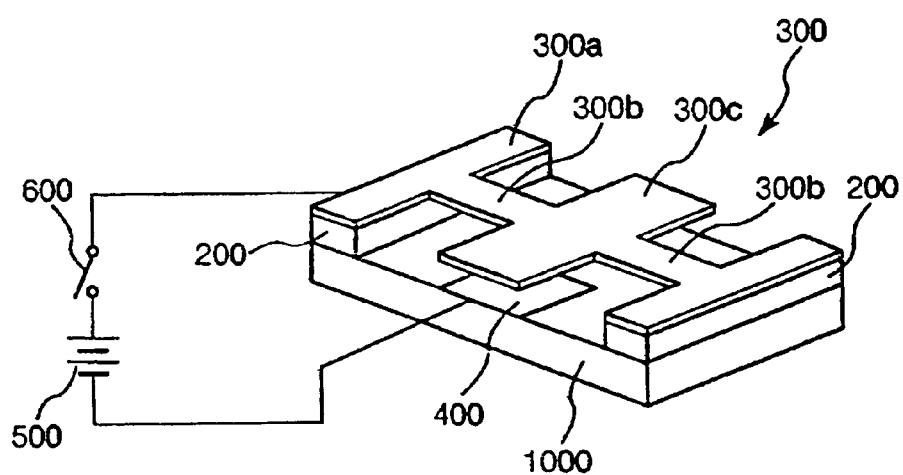
FIG. 10 is a perspective view which shows a conventional actuator.

Next, a fourth embodiment of the actuator according to the present invention will be described. FIG. 9 is a plan view which shows the fourth embodiment of the actuator according to the present invention. Hereinafter, an actuator 100C shown in FIG. 9 will be described by focusing on the difference between the first and fourth embodiments, and therefore a description of the same points will be omitted. The actuator 100C of this embodiment is driven by two piezoelectric actuators (that is, two actuators each having a piezoelectric element) 31, 31 respectively provided on the surfaces of the first mass portions 1, 11 (that is, the surface opposite to the surface on which the counter substrate 6 is provided).

Specifically, as shown in FIG. 9, the actuator 100C includes a pair of piezoelectric actuators 31, 31 provided at one end portion (a part) of the surface of each of the first mass portions 1, 11. In the actuator 100C of this embodiment, distortion (expansion and contraction) is generated on the first mass portions 1, 11 by the driving of the piezoelectric actuators 31, 31 to drive the second mass portion 2.

In this embodiment, by providing the piezoelectric actuators 31, 31 on the first mass portions 1, 11, respectively, it is no need to provide the electrodes (driving electrodes) 7, and therefore it is possible to reduce the manufacturing costs thereof. Further, since the driving electrodes 7 are not required, it is possible to arrange the opening 61 on the positions corresponding to the first mass portions 1, 11. This makes it possible to enlarge the rotation angle of each of the first mass portions 1, 11.

Further, in this embodiment, one (or one-layer) piezoelectric actuator 31 is provided on each of the first mass portions 1, 11, but the present invention is not limited to this structure. For example, two or more (or two-or-more-layer) piezoelectric actuator such as a bimorph type piezoelectric actuator may be provided. The bimorph type piezoelectric actuator is an actuator having two-layer structure piezoelectric actuator (that is, two piezoelectric actuators) that can generate flexural oscillation in which one of the two piezoelectric actuators is subjected to vibration in a compressed direction thereof at the same time when the other is subjected to vibration in an expanded direction thereof.

In this regard, in this embodiment, the piezoelectric actuators 31, 31 are respectively provided at the end portions of the surfaces of the first mass portions 1, 11, but the present invention is not limited to this structure. For example, the piezoelectric actuator 31 may be provided at the whole area of the surface of each of the first mass portions 1, 11. Alternatively, the piezoelectric actuator 31 may be provided at the end portion or the whole area of the surface of each of the first mass portions 1, 11 which faces the counter substrate 6.

The actuators described above based on the first to fourth embodiments can be preferably applied to optical scanners to be used in laser printers, bar-code readers, confocal scanning laser microscopes and the like, or displays for imaging, for example.

Although the actuator according to the present invention has been descried with reference to the embodiments shown in the drawings, the present invention is not limited thereto. For example, so long as the same or similar functions are achieved, it is possible to make various changes and additions to each portion of the actuator of the present invention. Further, each of the actuators of the embodiments described above has the pair or two pairs of first elastic connecting portions 4 or 4', but the actuator according to the present invention is not limited thereto and may have three or more pairs of first elastic connecting portions 4, for example.

Similarly, each of the actuators of the embodiments described above has the pair or two pairs of second elastic connecting portions 5 or 5', but the actuator according to the present invention is not limited thereto and may have three or more pairs of second elastic connecting portions 5 or 5', for example.

Moreover, in each of the actuators of the embodiments described above, the light reflection portion 21 is provided on the surface of the second mass portion 2 which does not face the counter substrate 6, but in the actuator according to the present invention, the light reflection portion 21 may be provided on the opposite surface of the second mass portion 2, or may be provided on both surfaces of the second mass portion 2, for example.

Furthermore, in each of the actuators of the first and second embodiments described above, the electrodes 7 are provided on the counter substrate 6, but in the actuator according to the present invention, the electrodes 7 may be provided on the first mass portion 1, or may be provided on both of the counter substrate 6 and the first mass portion 1, respectively. Moreover, in each of the actuators of the first and second embodiments described above, the two pairs of electrodes 7 are respectively provided at the positions corresponding to the first mass portions 1, 11, but the actuator according to the present invention is not limited thereto. For example, one or three or more electrode 7 may be provided at each of the corresponding positions.

In this regard, in the case where one electrode 7 is provided at each of the positions corresponding to the first mass portions 1, 11, it is preferable that sinusoidal wave (alternating voltage) to which an offset voltage is added and in which the minimum electric potential becomes ground potential is applied to the one electrode 7, for example.

Further, in each of the actuators of the embodiments described above, the first elastic connecting portions 4 or 4' and the second elastic connecting portions 5 or 5' have shapes shown in the drawings, but in the actuator according to the present invention, the shapes thereof are not limited thereto and they may have a crank shape or a branched shape, for example.

Moreover, in each of the actuators of the first and second embodiments described above, the insulating film is provided on the surface of each of the first mass portions 1, 11, which is a surface facing the electrodes 7, for preventing a short circuit, but in the actuator according to the present invention, the insulating film may be provided on the surface of the electrodes 7 or may be provided on the surfaces of both of the first mass portions 1, 11 and the electrodes 7, for example.

Furthermore, in the actuator of the third embodiment described above, the coil 20 is provided on the surface of each of the first mass portions 1, 11 which does not face the counter substrate 6, but in the actuator according to the present invention, the coil 20 may be provided on the opposite surface of each of the first mass portions 1, 11, or may be provided inside each of the first mass portions 1, 11, for example.

Further, in the example of the manufacturing method of the actuator described above, the upper substrate 60 is integrally formed, but the upper substrate 60 is not limited to one integrally formed. For example, a substrate obtained by integrally forming the first mass portions 1, 11, the second mass portion 2, the supporting portions 3, 3, the first elastic connecting portions 4, 4 and the second elastic connecting portions 5, 5 may be bonded to the lower substrate 70 through spacers 9, 9 formed of glass or the like. Alternatively, each of these portions may be separately formed, and then the thus obtained portions may be assembled by bonding.

What is claimed is:

1. An actuator of the type employing a two-degree-of-freedom vibration system, the actuator comprising:
a pair of first mass portions;
a second mass portion provided between the pair of first mass portions;
a pair of supporting portions for supporting the pair of first mass portions and the second mass portion;
a pair of first elastic connecting portions which respectively connect the first mass portions to the supporting portions so that each of the first mass portions can rotate with respect to the supporting portions, wherein each of the first connecting portions comprises a pair of elastic connecting members which are arranged so as to have a substantially V-shape form; and
a pair of second elastic connecting portions which connect the second mass portion to the respective first mass portions so that the second mass portion can rotate with respect to the first mass portions, wherein each of the second elastic connecting portions comprises a pair of elastic connecting members which are arranged so as to have a substantially V-shape form;
wherein each of the first mass portions is driven by the application of an alternating voltage, causing the second mass portion to rotate.

2. The actuator as claimed in claim 1, wherein each of the pair of first elastic connecting portions and the pair of second elastic connecting portions each having the V-shape form has an apex and two base ends, in which a central axis for rotation of the first mass portions and the second mass portion extends through the apexes of the first and second elastic connecting portions.

3. The actuator as claimed in claim 2, wherein each of the first connecting portions each having the V-shape form is connected to the corresponding supporting portion at its apex and connected to the corresponding first mass portion at its base ends.

4. The actuator as claimed in claim 2, wherein each of the second connecting portions each having the V-shape form is connected to the corresponding first mass portion at its apex and connected to the second mass portion at its base ends.

5. The actuator as claimed in claim 2, wherein each of the V-shape forms of the first elastic connecting portions and the second elastic connecting portions has a symmetrical shape with respect to the central axis for rotation of the first mass portions and the second mass portion.

* * * * *